United States Patent Office 3,332,979
Patented July 25, 1967

3,332,979
SULFATION OF ALCOHOLS USING UREA-MODIFIED SULFURIC ACID
Clio Ernst Redemann, Monterey Park, Calif., assignor to Purex Corporation, Ltd., Lakewood, Calif., a corporation of California
No Drawing. Filed Feb. 10, 1964, Ser. No. 343,500
10 Claims. (Cl. 260—458)

This invention relates to the sulfation of alcohols and is particularly concerned with novel procedure for sulfating aliphatic alcohols and alkylated aromatic ether alcohols, preferably of relatively high molecular weight, using urea-modified sulfuric acid as sulfating agent.

The sulfation of high molecular weight aliphatic alcohols and alkylphenol-ethylene oxide condensates carrying an alkanol group, to form sulfuric acid esters or sulfates for use as detergents and foaming agents is well known. The sulfating agents generally employed in prior art processes include sulfur trioxide, concentrated sulfuric acid or cholorsulfonic acid. However, in the sulfation of alkyl aryl ether alcohols by such prior art sulfation processes, sulfonation of the aromatic ring often occurs, adversely affecting the properties of the sulfated material as a foam builder. Also, oxidation often occurs during sulfation by these prior art processes, resulting in an undesirably discolored product. For incorporation into commercial detergent formulations, such sulfated products should be white or as light colored as possible. Where fuming or concentrated sulfuric acid is used as the sulfating agent, the excess sulfuric acid present in the reaction mixture must be neutralized. This is usually accomplished by neutralizing such excess sulfuric acid to sodium sulfate which remains in the product. However, if too much of such sodium sulfate is present in the product, the alcohol which is usually added to such detergent materials when the end product desired is a liquid product, causes precipitation of some of the solid salt, resulting in an unsightly product unsuitable for marketing. Also, such prior art sulfation processes are generally carried out at about ambient temperature or below, to avoid the formation of undesirable reaction products. Conducting reactions at these low temperatures requires the maintenance of costly refrigeration, since substantial amounts of heat are liberated in the reaction. Sulfamic acid has also been used in the prior art as a sulfating agent, but this material is relatively expensive as compared, for example, to sulfuric acid.

The use of sulfuric acid containing dissolved urea as a sulfating agent is also known. Such prior art process generally employs less than one-half mole of urea per mole of sulfuric acid. Although the presence of the urea tends to reduce the activity of the sulfuric acid and thus reduces to some extent the amount of ring sulfonation and the oxidizing action which results in undesirable color bodies, the concentration of sulfuric acid in such urea-modified sulfuric acid sulfating solutions is still sufficiently high so that substantial ring sulfonation and oxidation producing a discolored product, still result. Further, such prior art process is carried out at about ambient temperature and at atmospheric pressure, thus precluding relatively complete conversion and high yields of the sulfate product within commercially economical reaction time periods.

One object of the invention is the provision of procedure for the sulfation of aliphatic alcohols and alkylated aromatic ether alcohols, preferably of high molecular weight, substantially without discoloration of the sulfated product, and substantially without sulfonation of the aromatic ring of such aromatic ether alcohols.

Another object is to provide novel procedure for sulfating the above-noted high molecular weight alcohols employing urea-modified sulfuric acid as sulfating agent under conditions to produce a high yield of the sulfated product having the above-noted characteristics of freedom from sulfonation of the aromatic ring and freedom from discoloration.

A still further object is to provide a unique process for the sulfating of fatty alcohols and alkylphenolethylene oxide condensates containing a free terminal alcohol group, employing urea dissolved in sulfuric acid as sulfating agent, and employing a proportion of urea to sulfuric acid and other reaction conditions such as to produce a sulfated material which on neutralization with ammonia forms and ammonium detergent sulfate having a light color and which has excellent foam building properties.

Other objects and advantages of the invention will be apparent hereinafter.

It has now been found that by using as the sulfating agent a urea-modified sulfuric acid containing a substantial proportion of urea, and having a substantially higher ratio of urea to sulfuric acid as compared to the above noted prior art process, and by carrying out the sulfation under different reaction conditions, particularly employing high temperatures, preferably above about 90° C., and reduced pressures, preferably below about 100 mm. mercury, the above-noted alcohols, and especially the alkylated aromatic ether alcohols, can be sulfated to produce a foaming and detersive agent of high quality and in excellent yield. The novel invention process also has the advantages of the use of economic raw materials, avoidance of objectionable waste products to be disposed of, and the sulfating agent is substantially less corrosive than the prior art sulfating agents, including the prior art urea-modified sulfuric acid sulfating agent having low urea and high sulfuric acid concentration.

Thus, by employing for example, a one to one molar ratio of urea to sulfuric acid in the sulfating agent according to the invention, although the acidity of the sulfating agent is decreased to a point where aromatic ring sulfonation in the preferred alkylated aromatic ether alcohols employed, and oxidation, are reduced to a point where a substantially color-free product free from ring sulfonated products is produced, it has been found surprisingly that the acidity is still sufficient to obtain efficient sulfation.

Further, by employing reduced pressure, preferably down to the order of about 20 to 40 mm. mercury during at least the final stages of the reaction, and by employing elevated temperatures of the order of about 110° C., the reaction proceeds rapidly without formation of side products and water is driven from the reaction mixture, causing the reaction to proceed rapidly to substantial completion, resulting in conversion of the alcohol to the desired sulfated material in high yield. The reaction mixture can then be ammoniated readily to produce a substantially neutral high quality ammonium detergent sulfate product.

Aliphatic or fatty alcohols which can be sulfated according to the invention procedure include the high molecular weight or long-chain saturated and unsaturated normal primary fatty alcohols having from about 8 to about 20 carbon atoms. Specific examples of aliphatic alcohols which can be sulfated according to the invention are octyl, decyl, lauryl, myristyl, cetyl and stearyl alcohols. Illustrative of unsaturated alcohols which can be sulfated by the invention process is oleyl alcohol, and may also include linoleyl and linolenyl alcohols. Such alcohols include the commercially available mixtures of fatty alcohols of varying carbon chain length. The unsaturated alcohols are usually more difficult to sulfate than the saturated alcohols, due to the presence of the unsaturated bonds which may be affected by the sulfating agent.

The alkylaryl polyalkoxy alkanols which are preferably sulfated according to the invention procedure to produce high quality foam builders and detergents are those having the formula,

A—R—(O—CH$_2$CH$_2$)$_n$—OH where A is an alkyl group of from about 6 to about 18 carbon atoms, preferably 8 to 12 carbon atoms, and such alkyl groups can be straight-chain or branched-chain alkyls. Thus, for example, A can be hexyl, heptyl, octyl, nonyl, decyl, undecyl, dodecyl, etc., or branched-chain alkyls can also be employed, wherein the branched chains connected to the main alkyl chain can contain from 1 to about 3 carbon atoms, e.g., methyl, ethyl and propyl, as in isohexyl, isooctyl, 2-ethyl hexyl, and the like. The 8 to 12 carbon atom straight-chain alkyls are preferred over the 8 to 12 carbon atom branched-chain alkyls since the compounds formed from the straight-chain alkyls are more readily biodegradable than the branched-chain materials, and biodegradability of detergents is important from the standpoint of meeting health and sanitation specifications in relation to the disposal of spent detergent solutions. R in the above formula is aryl, e.g., phenyl or naphthyl, preferably phenyl, and $n$, which can range from 1 to as high as 100, is preferably about 3 to about 10, most desirably 4 to 5, for those alcohols which are preferred for producing the sulfated detergent materials of the invention. It will be noted that the alcohol starting materials are all monoalcohols having one hydroxyl group on the terminal ethylene group. It will also be noted that there is an ether linkage between the aryl, e.g., phenyl group, and the adjacent ethylene group. This ether group makes the phenyl group especially reactive toward ring sulfonation, by such reagents as oleum and sulfur trioxide.

Specific examples of preferred compounds within the formula for the alcohols noted above include the octyl, nonyl, decyl, undecyl, and dodecyl-phenoxy triethyoxy-ethanol, and the corresponding tetraethoxy ethanol derivatives, the nonyl phenoxy derivatives of the triethoxy and tetraethoxy ethanol being particularly desirable for producing valuable foaming agents and detergents by the sulfating process of the invention.

The preferred alkylphenol-ethyleneoxide condensate alcohols used as starting material are produced in known manner by reacting ethylene oxide with an alkylated phenol employing various types of alkaline catalysts. Depending on the catalyst used and the conditions of the reaction, the number of ethylene oxide groups in the compound can be controlled as desired.

The sulfuric acid employed for producing the urea-modified sulfuric acid sulfating agent of the invention process can vary in strength from about 90 to 100 percent sulfuric acid. In preferred practice, 95 to 100 percent sulfuric acid is utilized. The use of such concentrated acids reduces the amount of water which is required to be removed to cause the reaction to be driven toward completion. If the concentration of sulfuric acid employed in producing the urea-modified sulfuric acid sulfating agent is reduced to below about 90 percent H$_2$SO$_4$, not only is the amount of water required to be removed from the reaction mixture increased, but the use of such dilute acids causes a foaming problem.

The molar proportion of sulfuric acid employed to the alcohol to be sulfated preferably is in the range of from about 1 to about 1.1 moles H$_2$SO$_4$ per mole of the alcohol. The use of a greater proportion than 1.1 mole H$_2$SO$_4$ per mole of the alcohol has no adverse effect on the sulfation reaction but has the disadvantage of producing an increased amount of ammonium sulfate salt by reaction of the excess sulfuric acid with the ammonia used for neutralization, such excess ammonium sulfate being undesirable in the final product.

It has been found that the molar ratio of urea to sulfuric acid (H$_2$SO$_4$) employed for producing the sulfating agent should not be less than about 0.95, the preferred ratio being about a one to one molar ratio of urea to H$_2$SO$_4$. Generally between about 0.95 and about 1.2 moles of urea are employed per mole of sulfuric acid in the sulfating agent. In some instances it may be advantageous to employ a greater urea to H$_2$SO$_4$ molar ratio than 1.2, e.g., up to 1.5, where, for example, unsaturated aliphatic alcohols such as linoleyl alcohol, is to be sulfated. This higher ratio of urea to sulfuric acid reduces the acidity of the sulfating agent still further, and is thus desirable for sulfating unsaturated aliphatic alcohols because of the sensitiveness of such alcohols to polymerization by a sulfating agent having too high an acidity. Under the pressure and temperature reaction conditions of the instant process, if a molar ratio of urea to sulfuric acid less than about 0.95 is employed, and especially the much lower ratios such as ½ mole urea per mole H$_2$SO$_4$ or below employed in the prior art processes, side reaction products form at this high acidity, such as ethers and unsaturated compounds, resulting in a low quality product of poor color and which is commercially unacceptable.

In carrying out the reaction for sulfating the above alcohols, according to the invention, the alcohol to be sulfated is mixed with the sulfating agent consisting of urea dissolved in sulfuric acid in the proportions noted above. Heat is then applied to raise the temperature of the reaction mixture to about 90° to about 140° C. during the reaction period. Preferably the reaction is carried out at temperatures of between about 110° to about 125° C. It is preferred not to heat the reaction mixture above about 125° C., particularly where the alcohols are of a more sensitive type such as the unsaturated aliphatic alcohols noted above. The use of too high a temperature, for example, above 140° C., causes decomposition, discoloration and oxidation of the product. If the reaction is carried out below about 110° C., the rate of reaction progressively decreases and below about 90° C. the time period for reaction becomes economically undesirable. However, the reaction can be carried out at elevated temperature below about 90° C. at further decreased rates.

In conjunction with the use of the elevated temperatures noted above in the reaction process, it is particularly important that the reaction be carried out at least in its terminal portion, at substantially reduced pressure, generally below about 100 mm. mercury absolute, and preferably less than about 40 mm., e.g., between about 40 and about 20 mm. mercury or lower. The use of these reduced pressures in conjunction with the high temperature drives the reaction to completion rapidly and with high conversions of the alcohol to the sulfate, by removal of water from the reaction mixture. The entire reaction can be carried out at the above-noted reduced pressures, e.g., of the order of 20–40 mm., or lower. However, if desired, a substantial or major portion of the reaction period can be carried out at substantially higher pressures, e.g., at pressures about or close to atmospheric. For example, the vacuum pump can be started at the commencement of the reaction, and much of the reaction can be carried out while the reaction zone is being evacuated down to the above-noted 20–40 mm. mercury. It is sufficient if the last-mentioned reduced pressure is attained in the latter portion of the reaction period. It is thus feasible to operate at about atmospheric pressure over a major portion of the initial reaction, the reduced pressure in the range of about 20 to 40 mm. Hg only being required in the terminal portion of the reaction, say, for about the last one-half hour of the reaction period. The main function of the reduced pressure is to strip off water and drive the equilibrium to substantially complete reaction and to obtain a high yield of sulfated product.

A relatively short period of reaction of from about 1 to about 2½ hours is required under the above-noted reaction conditions. The actual reaction time required is in part determined by the specific reaction rate of the alcohol under consideration. As previously noted, if it is attempted to speed up the reaction to too great an extent, e.g., by increasing the concentration of sulfuric acid in the urea-modified sulfating agent or by inordinate increase in temperature, a poor quality product with excessive color formation results. Also, as previously noted, the time of reaction can be prolonged at the cost of efficiency by lowering the temperature below about 90° C.

Some unreacted urea is always present at the end of the reaction period. According to the reaction mechanism, it is believed that the sulfuric acid reacts with the alcohol to form the half ester, and the water thus liberated hydrolyzes the urea to produce carbon dioxide and ammonia. The unreacted urea present in the reaction mixture is not objectionable but actually functions desirably as a hydrotroping agent to increase the solubility of the sulfated material in aqueous solution. The amount of unreacted urea present on termination of the reaction is generally less than about 10% of the initial urea present in the sulfating medium.

After the reaction is completed, the reaction mixture is cooled down to below about 75° C., say, down to 60° C. At this point, an alcohol is added to the reaction mixture in an amount such as to thin out the mixture sufficiently to place it in a handleable form. Alcohols which can be used for this purpose include ethyl alcohol, isopropanol, and n-propanol, for example. Water is then usually added to dilute the product, where the product desired is to be in the form of an aqueous solution. The alcohol and water are simply added in amounts such as to give the desired solution concentration with respect to active material, i.e., the sulfated product.

Ammonia, for example in the form of an aqueous ammonium hydroxide solution, is then added to the sulfated reaction mixture in amount sufficient to adjust the pH to the final desired value. The major portion of the ammonia for this purpose is furnished by the decomposition of the urea during the reaction period, the additional ammonia required being provided by the added ammonia solution. A preferred final foaming and detergent sulfate material of this type produced according to the invention is so adjusted with ammonia to a pH of between about 6.5 and 7.0. The active material in the final reaction mixture is accordingly an ammonium sulfate salt of the initial alcohol which has been sulfated.

The yield of sulfated product which can be produced according to the invention process can range from 90% up to about 95%, which is substantially higher than the yield of sulfated product produced by most prior art sulfating procedures.

The final ammoniated mixture described above, and which includes water, alcohol and excess urea can be used directly as a wetting agent and detergent, or it can be employed in admixture with other materials. Thus, the above-described neutralized sulfated alcohol mixture can be combined with soaps, alkyl aryl sulfonate detergents, non-ionic detergents, phosphates, and the like, to form general cleaning materials, or it can be employed in any other manner known to the art for producing a detergent material.

A preferred use for the above-noted reaction mixture produced by sulfating the preferred alkyl phenol ethylene oxide condensation products according to the invention is in light-duty detergents formed by mixing the aqueous sulfated and ammoniated reaction mixture with foam stabilizers and perfumes in known manner.

The sulfated material produced according to the invention has foaming, detergency and wetting properties, is of good light color, preferably substantially white, but may be off-white or pale yellow, and is of low odor, the latter property depending, to some extent, upon the alcohol sulfated.

As an alternative to the above final procedure, after completion of the sulfating reaction, ammoniation of the alcohol sulfate can be carrier out without any dilution with alcohol or water, and the resulting product is then allowed to stand or is dried to remove water, and forming a semi-solid to solid product.

The following are examples of practice of the invention:

*Example 1.—Nonylphenoxy (4–5 ethyleneoxy) ammonium sulfate*

In a flask, equipped with a therometer for measuring the reaction mixture temperature and a mechanical stirrer having a seal for operation in vacuo, is placed 114 parts (1.1 mole) of 95% sulfuric acid. Urea (60 parts; 1.0 mole) is added to the sulfuric acid and the mixture is stirred until the urea has dissolved.

As soon as the urea has dissolved, 407 parts of technical nonylphenoxy-polyethoxyethanol, containing an average of 4 to 5 ethoxy groups, e.g., the material marketed as Igepal CO–430, is added, the stirrer is started, and heat is applied until the temperature reach 110° C. At this point, the vessel is evacuated to a pressure of 20–40 mm. of mercury absolute. Heating at 110°–125° C., stirring and evacuation are continued for about 1.5 hours. At this time a sample of the reaction mixture is withdrawn for analysis. The free acid content is determined, indicating completion of reaction. About a 92% conversion is obtained.

The approximate equation expressing the overall reaction is

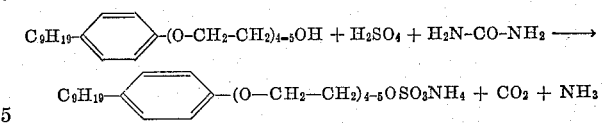

When the reaction is finished, as determined above, the temperature of the reaction mixture is lowered by cooling to about 60° C. Stirring becomes difficult at this point because of the very high viscosity of the reaction mixture. Hence, a mixture of 96 parts denatured ethanol, 170 parts of water and sufficient 15 Normal ammonium hydroxide to bring the mixture to a pH of 6.5–7.0 is added, and the mixture is analyzed and sufficient water added to give a final solution of 58% active content, that is, 58% of the ammonium salt of the sulfated ethylene oxide condensation product.

This material when added to warm water produced a clear, foamy highly detergent solution.

*Example 2*

The reaction procedure of Example 1 is repeated, except that after heating the reaction mixture to 110° C. at the beginning of the reaction period, the reaction zone is gradually evacuated from atmospheric pressure at the initial portion of the reaction down to 20 to 40 mm. of mercury absolute after about one hour of the reaction period. For about the last remaining half hour of the reaction period, the pressure is maintained at about 20 to 40 mm. of mercury.

A conversion of the starting alcohol to sulfate of the order of about 90% to 95% is obtained.

*Example 3.—Ammonium lauryl sulfate*

Sixty parts (1.0 mole) of urea were dissolved in 114 parts of 95% sulfuric acid (1.1 mole) employing external cooling and agitation to keep the temperature below 110° C. As soon as all the urea has dissolved, 186 parts (1.0 mole) of lauryl alcohol were added with continued agitation. The lauryl alcohol used was Lorol S which is 61% lauryl alcohol, the remainder being higher molecular weight alcohols such as myristyl and palmityl alcohols. At this stage the reaction mixture was composed of two non-miscible liquid phases. The flask was now connected so that water vapor and other gaseous products could be removed in vacuo. External heating was applied until the temperature reached 115–120° C., at which time evacuation of the reaction vessel was commenced. The temperature was slowly increased to 125° C. during the next 20 minutes. The temperature was maintained at 120–125° C. during the balance of the reaction period.

The rate of evacuation was so regulated that approximately 90 minutes were required to lower the pressure to 35 mm. of mercury. This pressure was maintained for the following 30 minutes, at which time heating, stirring and evacuation were stopped and the system was permitted to return to atmospheric pressure, after which it was neutralized with a small amount of 28% ammonia. Upon cooling to atmospheric temperature, the reaction mixture solidified to give 350 parts of a solid cake of white waxy appearing material. Analysis of this solid by the Hyamine titration showed the material to be 75% ammonium lauryl sulfate, amounting to a conversion estimated to be above 90% of theory, based on the lauryl alcohol content of the Lorol S starting material.

This white solid dissolved readily in warm water to give a clear, highly foaming, strongly detergent solution.

*Example 4.—Ammonium oleyl sulfate*

Thirty parts (0.5 mole) of urea were dissolved in 53 parts (0.5 mole) of 93% sulfuric acid with external cooling while stirring the reaction mixture and keeping the temperature below 110° C. As soon as the urea had dissolved 135 parts (0.5 mole) of technical oleyl alcohol (Siponal OC) were added. The reaction vessel was arranged for evacuation and external heating. Since the oleyl alcohol formed a second liquid phase, stirring was continued throughout the reaction period. The evacuation was started and when the pressure had dropped to 100–135 mm., external heating was commenced. The temperature was slowly increased to 120–125° C., while simultaneously the pressure was lowered to 30–35 mm. About 15 minutes were required to reach these conditions of temperature and pressure; by this time the reaction mixture had become one homogeneous phase. Heating and evacuation were continued for an additional 100 minutes, at which time both heating and evacuation were stopped and the system was permitted to return to atmospheric pressure. When the temperature had dropped to about 50° C., 40 parts of ethanol and 60 parts of water were added and the solution was brought to neutrality with 28% aqueous ammonia. This gave 305 parts of a clear amber-colored solution which, by the Hyamine titration method, contained 168 parts of ammonium oleyl sulfate (92% of theory).

When a small amount of this alcoholic solution of ammonium oleyl sulfate was added to water, it produced a clear, strongly foaming, highly detersive solution.

*Example 5.—Octylphenoxy (tetraethyleneoxy) ethyl ammonium sulfate*

One hundred twenty parts (2.0 moles) of urea were dissolved in 210 parts (2.10 mole) of 98% sulfuric acid employing external cooling and stirring to maintain the temperature below 100° C. during the dissolving of the urea. As soon as all the urea had dissolved, 950 parts (2.0 moles) of octylphenoxy (tetraethyleneoxy) ethanol (Igepal CA–520) were added with continued stirring. The reaction vessel was arranged for removal of volatile products in vacuo while mechanical agitation was maintained. External heating was commenced, and when the temperature had reached 120–125° C., agitation and heating were continued for one hour. At the end of this period, evacuation of the reaction vessel was initiated and the rate of evacuation was so adjusted such that after an additional 60 minutes, a pressure of 30–35 mm. of mercury had been reached in the vessel. This pressure was maintained for an additional 20 minutes, at which time the pressure in the vessel was returned to atmospheric pressure and external cooling was applied to the reaction vessel. When the temperature of the reaction mixture had dropped to 55° C., 400 parts of 95% isopropanol were added, after which the pH of the reaction mixture was adjusted to 7.3 by the addition of 28% aqueous ammonia. Subsequent to adjusting the pH of the reaction mixture, 450 parts of water were added, giving a total of 2050 parts of a product which by Hyamine titration showed 980 parts of the desired octylphenoxy (tetraethyleneoxy) ethyl ammonium sulfate.

This solution was very pale yellow in color and was suitable for incorporation in various liquid detergent products without further processing.

*Example 6.—Typical light-duty liquid detergent*

(Made from nonylphenol (4-5 ethyleneoxy) ammonium sulfate)

Improved light-duty liquid detergents are readily prepared with a range of components as indicated below when using ammonium nonylphenol (4–5 ethyleneoxy) sulfate produced by the process of Example 1 or 2 above, as an auxiliary detergent and foam builder.

| | Percent |
|---|---|
| Sodium alkylbenzene sulfonate, the alkyl group containing an average of about 12 carbon atoms | 15–30 |
| Ammonium nonylphenol (4–5 ethyleneoxy) sulfate (100% basis) | 12–6 |
| Lauric diethanolamide | 2–5 |
| Denatured alcohol | 2–1 |
| Perfume, thickener, color | 0–2 |
| Water | Balance |

From the foregoing, it is apparent that the invention provides a novel procedure for sulfating high molecular weight alcohols, particularly alkyl phenolethylene oxide condensate alcohols, using urea-modified sulfuric acid, wherein a high proportion of urea is present, at high temperatures and at reduced pressures to produce a sulfated alcohol product, especially a sulfate of the above-noted ethylene oxide condensate alcohols, which is particularly valuable as a foam builder and detergent, the product being of high quality and light color, and produced in high yields.

While I have described particular embodiments of my invention for the purpose of illustration, it should be understood that various modifications and adaptations thereof may be made within the spirit of the invention, as set forth in the appended claims.

I claim:

1. Process for the preparation of sulfated alcohols comprising reacting a sulfuric acid solution containing above 0.95 mole of urea per mole of $H_2SO_4$ with an alcohol selected from the group consisting of fatty alcohols containing from 8 to 20 carbon atoms and alkylaryl polyalkoxy alkanols in which the aryl group is phenyl or naphthyl at temperatures above about 90° C. and pressures less than about 100 mm. Hg during at least a portion of the reaction.

2. Process according to claim 1 including removing water from the reaction zone during reaction.

3. Process according to claim 1 in which the alcohol is an alkyl phenoxy polyethoxy alkanol.

4. Process according to claim 1 in which the sulfuric acid solution is aqueous and contains above 90% $H_2SO_4$ by weight and from 0.95 to 1.2 moles of urea per mole of $H_2SO_4$ present.

5. Process according to claim 4 including effecting the reaction at temperatures above about 110° C.

6. Process according to claim 5 including maintaining a pressure of less than 40 mm. Hg during the terminal portions of the reaction.

7. Process according to claim 1 in which the alcohol is a fatty alcohol.

8. Process according to claim 7 in which the fatty alcohol is selected from the group consisting of octyl, decyl, lauryl, myristyl, cetyl, stearyl, oleyl, linoleyl and linolenyl alcohols.

9. Process according to claim 8 including also generating ammonia in said solution and reacting the ammonia with the sulfated alcohol product.

10. Process for sulfating alcohols including mixing together approximately equimolar amounts of sulfuric acid in aqueous solution and urea and heating the mixture together with a fatty alcohol having from 8 to 20 carbon atoms at temperatures above about 90° C. and removing water from the reaction zone under pressures of less than 100 mm. Hg at least during the terminal portion of the sulfation reaction.

References Cited
UNITED STATES PATENTS 2,147,785   2/1939   Cupery et al. _____ 260—400

CHARLES B. PARKER, *Primary Examiner.*

FLOYD D. HIGEL, *Examiner.*

UNITED STATES PATENT OFFICE
CERTIFICATE OF CORRECTION

Patent No. 3,332,979                                          July 25, 1967

Clio Ernst Redemann

It is hereby certified that error appears in the above numbered patent requiring correction and that the said Letters Patent should read as corrected below.

Column 9, line 3, for the claim reference numeral "8" read -- 6 --.

Signed and sealed this 20th day of August 1968.

(SEAL)
Attest:

Edward M. Fletcher, Jr.                              EDWARD J. BRENNER
Attesting Officer                                       Commissioner of Patents